United States Patent

Hintermann et al.

[15] 3,661,571

[45] May 9, 1972

[54] METHOD FOR THE PREPARATION OF POROUS METALLIC COPPER WITH DISPERSED GRAPHITE PARTICLES

[72] Inventors: Hans Erich Hintermann, Ins; Christian Jean Triquet, Neuchatel, both of Switzerland

[73] Assignee: Laboratoire Suisse de Recherches Horlogeres, Neuchatel, Switzerland

[22] Filed: July 12, 1968

[21] Appl. No.: 744,323

[30] Foreign Application Priority Data

Aug. 18, 1967 Switzerland..............................11625

[52] U.S. Cl...................................75/201, 75/211, 75/212, 75/0.5 A, 29/182.5

[51] Int. Cl. .......................................................B22f 9/00

[58] Field of Search.................75/201, 211, 206, 212, 0.5 A; 29/182.5

[56] References Cited

UNITED STATES PATENTS 3,399,051    8/1968    Hardy et al. ..............................75/0.5

Primary Examiner—Benjamin R. Padgett
Assistant Examiner—Brooks H. Hunt
Attorney—Stevens, Davis, Miller & Mosher

[57] ABSTRACT

A method for the preparation of a solid product characterized in that particles of a solid material homogeneously dispersed in a porous metallic mass is prepared in a liquid containing a metal dissolved in the form of a compound soluble in the liquid, the dispersion being mixed with a reagent capable of precipitating a compound of the metal so that at least a portion of the particles is entrapped in the precipitate in a uniformly dispersed state, the precipitate containing the dispersed particles being separated from the other constituents of the mixture, and the precipitate subjected to a treatment of reduction or thermal dissociation of a temperature which is below the melting point of the metal constituting the mass, to convert the compound of the metal directly into a solid elementary metal and into a vaporized by-product without any physical or chemical alteration of the dispersed phase.

4 Claims, No Drawings

METHOD FOR THE PREPARATION OF POROUS METALLIC COPPER WITH DISPERSED GRAPHITE PARTICLES

The present invention concerns a method for the preparation of a solid product comprising a pulverulent or porous metallic mass in which are dispersed particles of a solid material of a different kind.

It is often desirable to have mixtures which are as homogeneous as possible and comprise two solid state phases, of which one is a metallic mass and the other consists of fine solid particles dispersed in this mass. However the production of such perfectly homogeneous dispersions involves a difficult problem, in particular when the particles are very fine and must as far as possible be isolated from one another. In fact, defective homogeneity due to sedimentation of the phases or to agglomeration of the dispersed particles occurs frequently.

It is possible to prepare by fusion compact bodies consisting of a metallic matrix containing a dispersed phase which is very fine and homogeneous.

However, this method evidently does not permit the preparation of bodies in which the amount of the dispersed phase exceeds the limits of solubility. For instance, in the case of a dispersion of graphite in copper, the amount of graphite would be very small by reason of the poor solubility of the graphite in the molten copper.

The purpose of the invention is to remedy these insufficiencies of the prior art, and the method which it concerns is characterized in that a homogeneous dispersion of the said particles is prepared in a liquid containing at least one metal dissolved in the form of a compound soluble in the said liquid, the said dispersion is mixed with a reagent capable of precipitating a compound of the said metal so that at least part of the said particles is entrapped in the precipitate in an uniformly dispersed state, the precipitate containing the dispersed particles is separated from the other constituents of the mixture, and the precipitate is subjected to a treatment of reduction or thermal dissociation at a temperature which is below the melting point of the metal constituting the mass, to convert the compound of the said metal directly into solid elementary metal and into a vaporized by-product without any physical or chemical alteration of the dispersed phase.

The invention extends to the utilization of the product thus obtained for the manufacture of an article by compression of the product and, simultaneously or subsequently, heating of the product to the sintering temperature of the metallic mass, in a protective medium.

This product is thus suitable for numerous applications of powder metallurgy. For instance, by selecting a solid material in particles which has lubricating properties, such as graphite, it is possible to obtain a final sintered body having self-lubricating properties, in particular in the case where the metallic mass consists of a bronze.

By selecting a solid material in particles having abrasive properties, such as diamond or a carbide, it is possible to obtain a final abrasive body, for instance a grinding wheel.

By selecting a solid material in particles having a high coefficient of friction on steel, such as silica, it is possible to obtain a final brake lining. In this case it may be of advantage to utilize a material in particles composed of a mixture of silica and graphite, in order to avoid the formation of flaws.

To obtain a nuclear fuel, a material in particles having a fissile atomic nucleus may be used, in which case it is preferable to use a metallic mass which is resistant to creep in the compressed and sintered state, and has the properties required to act as a neutron moderator.

To obtain a material for rubbing electric contacts, for instance for collector brushes for electric motors, graphite may be used as material in particles, and a metal which is a good conductor of electricity, such as copper and silver, may be used as the metal constituting the mass. Such a material is distinguished by its good electric conductivity allied to low friction and good resistance to wear.

The following example illustrates the invention.

In a vessel provided with a high-speed agitator, 500 cc of demineralized water are mixed with 150 g of a colloidal graphite paste containing about 20 percent graphite, such as the paste sold under the trade mark "Hydrocollag" by the firm of Mssrs. Stehelin in Basel (Switzerland). A precise determination of the graphite content of the dispersion obtained may be effected by evaporation and weighing of an aliquot sample of the dilute dispersion.

To 100 cc of the homogeneous dispersion thus obtained is added a solution of 114 g copper chloride ($CuCl_2 \cdot 2H_2O$) in 400 cc demineralized water. While the dispersion is being violently stirred, 100 cc of an aqueous solution of caustic soda containing 53 g NaOH are gradually added. Cupric hydroxide precipitates in the form of a gel, carrying with it the colloidal graphite uniformly dispersed with in the precipitate.

To isolate and wash this precipitate, the suspension of cupric hydroxide is divided into two equal halves, each portion is placed in a cylinder of 1 liter capacity, the volume in each cylinder is completed to 1 liter by the addition of an aqueous solution of diluted ammonia (obtained by diluting 20 cc of a 25 percent solution of $NH_3$ in 5 liters of water), the precipitate is allowed to settle on the bottom of the cylinders, the supernatant liquid is decanted and the washing operation is repeated several times. The total volume of the ammonia washing solution employed is of 10 liters. This considerable amount of washing solution is necessary for the complete removal of the sodium chloride which is formed as a by-product of the precipitation. Once the washing has been effected, the precipitate is collected by filtration and dried in an oven, and thus copper oxide in which the graphite is uniformly dispersed is obtained. This product is crushed and passed through a sieve having a mesh opening of 0,15 mm.

To effect the reduction, the copper oxide powder is placed in a reactor and heated for 3 hours in a current of hydrogen at atmospheric pressure, at a temperature of 350° C. During this treatment, a reduction of the copper oxide to metallic copper takes place and the oxygen of the oxide combines with the hydrogen to form water vapour which is carried away by the current of hydrogen. After cooling, the product is withdrawn from the reactor. This product consists of a porous mass of metallic copper, in which the particles of colloidal graphite are isolated from one another and uniformly dispersed. The graphite content is about 12 percent in weight.

In a cylindrical type mixer, this product is mixed during 5 hours with tin powder, the proportion being 10–14 percent tin based on the total weight of tin and copper, this proportion corresponding to the composition of current tin bronzes. The mixture obtained is compressed, under a pressure of 10 t/cm$^2$, to cylindrical samples having a cross-section of 1 cm$^2$ and a height of 0,5 cm. These samples are sintered in a muffle furnace for 2 hours at a temperature of 750° C. in a vacuum of $10^{-3}$ mm Hg. After this sintering operation, the dimensions of the samples are brought back to their initial values by turning, after which they are again compressed under a pressure of 20 t/cm$^2$ and then sintered again for 2 hours at 750° C. in a vacuum of $10^{-3}$ mm Hg.

The final product thus obtained is a graphite bronze which may be used for the manufacture of self-lubricating bearings.

In the preceding example, the constitutive metal of the mass is precipitated in the form of a hydroxide, but it is to be understood that it is possible to precipitate any other compound of low solubility of this metal, for instance a carbonate, which is easily reducible or dissociable below the melting point of the metal.

As a general rule, the constitutive metal of the mass is first in the form of a salt dissolved in the dispersive liquid and the precipitation of the metal in the form of a hydroxide or of a salt which is insoluble or sparingly soluble is accompanied by the formation of a soluble salt comprising the anion of the metallic compound which was previously in solution and the cation of the hydroxide or salt used as the precipitating reagent. In order to avoid prolonged washing of the precipitate until it is practically free from this soluble salt, it may be advantageous to select the anion of the dissolved metallic salt and the cation of the precipitating reagent in such a manner that the resulting soluble salt is relatively volatile, such as for instance an ammonium salt, in order that the last traces of this salt soiling the precipitate be expelled in the course of the reduction or dissociation thermal treatment, in so far as such a choice is compatible with the constitutive metal of the metallic mass.

Instead of using elemental hydrogen as reducing agent, it would be possible to use any other gaseous reducing agent which does not adversely modify the constituents of the final product, such as for instance ammonia or cracked methanol or the vapour of a metal which is more electropositive than the constitutive metal of the precipitate.

On the other hand, when the metal used to form the mass is a metal which may exist in form of an oxide which is soluble in water and may be thermally dissociated without melting, under atmospheric or reduced pressure, such as is the case for the noble metals, and in particular for silver, the use of any reducing agent may be avoided altogether, and the oxide may be dissociated by simple heating in a non-oxidizing atmosphere, advantageously under reduced pressure.

In order to convert the solid pulverulent product into a compact article, it is possible, instead of effecting the compression and sintering steps successively, to resort to a method of elaboration in which pressure and temperature act simultaneously, such as extrusion, hot pressing or hot rolling.

We claim
1. A method for manufacturing a self-lubricating solid product containing porous metallic copper and dispersed graphite particles embedded therein, comprising
   a. dissolving copper chloride and homogeneously dispersing colloidal graphite particles in water,
   b. admixing the thus obtained dispersion with an alkali metal hydroxide to precipitate insoluble copper hydroxides,
   c. separating a mixture of said insoluble copper hydroxides together with said dispersed graphite particles from said liquid, and
   d. reducing or thermally dissociating, at a temperature below the melting point of the copper hydroxides of the last mentioned mixture, to metallic copper thereby producing porous metallic copper with graphite particles embedded therein.

2. A method according to claim 1, comprising the further steps of: separating the mixture of copper hydroxides and therein dispersed graphite particles by decantation; washing said mixture at least once with dilute aqueous ammonia; removing the resulting washing liquor by decantation and filtration; drying the remaining solid residue; crushing said dried residue and passing it through a sieve having a mesh width of about 0.15 mm; and heating the powder thus obtained in the presence of a gaseous reducing agent selected from the class consisting of hydrogen, cracked ammonia and cracked methanol until substantially all copper is present in the form of porous metallic copper.

3. A method according to claim 2, further comprising heating and compressing in an inert atmosphere at sintering temperature the mass of porous metallic copper with graphite particles embedded therein to obtain a shaped article.

4. A method according to claim 2, further comprising mixing the powder of porous metallic copper and dispersed graphite particles with metallic zinc powder, and heating and compressing in an inert atmosphere at sintering temperature the thus obtained powder mixture to obtain a shaped article.

* * * * *